United States Patent [19]

Farmer

[11] Patent Number: 4,792,191

[45] Date of Patent: Dec. 20, 1988

[54] AUTOMOBILE WHEEL PROTECTOR

[76] Inventor: Frederick M. Farmer, 4364 Real Ct., Orlando, Fla. 32808

[21] Appl. No.: 61,588

[22] Filed: Jun. 15, 1987

[51] Int. Cl.$^4$ ............................................. B05C 11/00
[52] U.S. Cl. ................................... 301/37 R; 118/505
[58] Field of Search ............. 301/37 R, 375 C, 375 S, 301/375 A, 375, 376 P, 37 P, 37 T, 37 ST, 37 CM, ; 118/505, 504, ; 150/52 K, ; 156/247; 152/DIG. 12; 40/587

[56] References Cited

U.S. PATENT DOCUMENTS

| | | | |
|---|---|---|---|
| 2,503,988 | 4/1950 | Arbib | 40/587 |
| 2,660,823 | 12/1953 | Dubin et al. | 40/587 |
| 3,319,687 | 5/1967 | Tomchak | 40/587 |
| 3,854,448 | 12/1974 | Kromanaker | 118/505 |

Primary Examiner—James B. Marbert

[57] ABSTRACT

A disk is cut from thin sheet material such as cardstock or plastic. The disc includes a radial cut from the center to the periphery thereof. A plurality of short radial slits is cut in the periphery spaced apart from the radial cut, and a plurality of tabs for engaging any of the slits is cut in the periphery and spaced apart from the radial cut in the opposite circumferential direction. Engaging a tab with a slit forms a cone and the spacings therebetween are selected to form cone diameters to match automobile wheel diameters. Finger holes are provided around the apex of a formed cone to permit holding the cone over a wheel while cleaning a tire on the wheel.

11 Claims, 1 Drawing Sheet

AUTOMOBILE WHEEL PROTECTOR

BACKGROUND OF THE INVENTION

1. Field of the Invention

The present invention relates to a protector for an automobile wheel for use during cleaning of the tires, and more particularly, to a low cost protector which can be adjusted for various size wheels.

2. Description of the Prior Art

In the automobile industry and among many owners of automobiles, it is common to periodically detail the vehicle; that is, to thoroughly clean and polish the automobile. A variety of types of wheels are now available on automobiles which may be formed from magnesium and various alloys, and which may have quite expensive wheel covers and wheel rings. Many automobile wheels are therefore expensive and have finishes or metal which may be damaged from harsh chemicals. Thus, special chemicals have been developed for specific types of automobile wheels. However, a different type of cleaning material is used for the tires and sidewalls to provide bright, clean white sidewalls and glossy appearance of the tire rubber. Many of these wheel cleaning materials available on the market will damage certain types of wheel covers or wheels. Furthermore, if the vehicle has been previously washed and the wheels washed free of dirt and road accumulations, spraying of the tire sidewalls with cleaning material will result in an overspray coating on the wheels. This would then require recleaning of the wheels since the material may, if not actually harmful to the wheels, result in a sticky film which will quickly collect road dust and brake dust.

Therefore, there is a need for a simple low cost device to protect the wheels from overspray when cleaning the tires of a vehicle.

It is known in the art to provide an adhesive circular ring attached to a tire to mask the tire surface while painting the wheels or the body of the car adjacent the wheel as disclosed in U.S. Pat. No. 2,726,634 to Horner. Mazerolle, in U.S. Pat. No. 3,481,652, teaches an adhesive disc to be applied to a wheel cover for carrying advertising information. Such adhesive would leave a residue on the cover when removed and therefore is not suitable for the present purpose.

SUMMARY OF THE INVENTION

The present invention is a novel automobile wheel protector formed from light cardboard, thin sheet plastic, sheet metal or the like. For example, ten point coated cardstock is eminantly suitable. The sheet material is cut in a circle which may be on the order of 20" in diameter. A narrow pie-shaped segment is cut from the disc and radial slots, which may have a length on the order of 1", are cut in the periphery of the disc adjacent to the cutout segment. For example, three such slots may be provided spaced apart as will be described hereinbelow. On the opposite side of the cutout segment, a pair of tabs is formed by cutting radial slots having a circumferential slot at the inner end thereof forming an inverted L. The spacing between the straight slots and the inverted L slots are adjusted such that engaging one of the tabs with one of the straight slots will produce a cone having a diameter equivalent to a selected wheel diameter. Thus, any size diameter wheel may be accommodated by appropriate spacings of the slots and tabs. For example, 13", 14", 15", and 16" spacings will accommodate the vast majority of motor vehicles. A larger disc can be provided to accommodate 20", 22" and 24" tractor trailer truck rim sizes.

A plurality of finger holes is provided which may be disposed in a circle around the center of the disc and spaced to accommodate the fingers of a user. As will now be recognized, when the disc is formed into a cone of the selected diameter, the cone may be picked up and held by inserting the fingers of one hand into the finger holes. The disc is then held in place over the wheel as a cleaning solution is sprayed onto the sidewalls of a tire and during rinsing of the tire. Thus, no cleaning solution can impinge on the wheel cover or wheels of the vehicle.

It is also desirable to lightly score radial lines on the disc which may be spaced, for example, at 45° intervals around the disc. These score marks will permit the disc to be folded into a 45° segment for ease of packaging and mailing if desired.

Where light cardboard is used to make the protector of the invention, it may be used as an advertising giveaway and imprinted with the advertiser's logo and message. The disc may be used one time and discarded. When the disc is formed from a more durable material such as thin plastic sheet, it may be rinsed off and stored for future use.

It is therefore a principal object of my invention to provide an automobile wheel protector which will prevent chemicals used for cleaning sidewalls of tires from contacting a wheel or wheel cover.

It is another object of my invention to provide a wheel protector which can be made at very low cost, which is light and easily handled, and which may be disposable.

It is still another object of my invention to provide a universal wheel protector which can be easily and quickly adjusted to any desired wheel size.

These and other objects and advantages of the invention will become apparent from the following detailed description when read in conjunction with the drawings.

DETAILED DESCRIPTION OF THE PREFERRED EMBODIMENT

Figure 1:
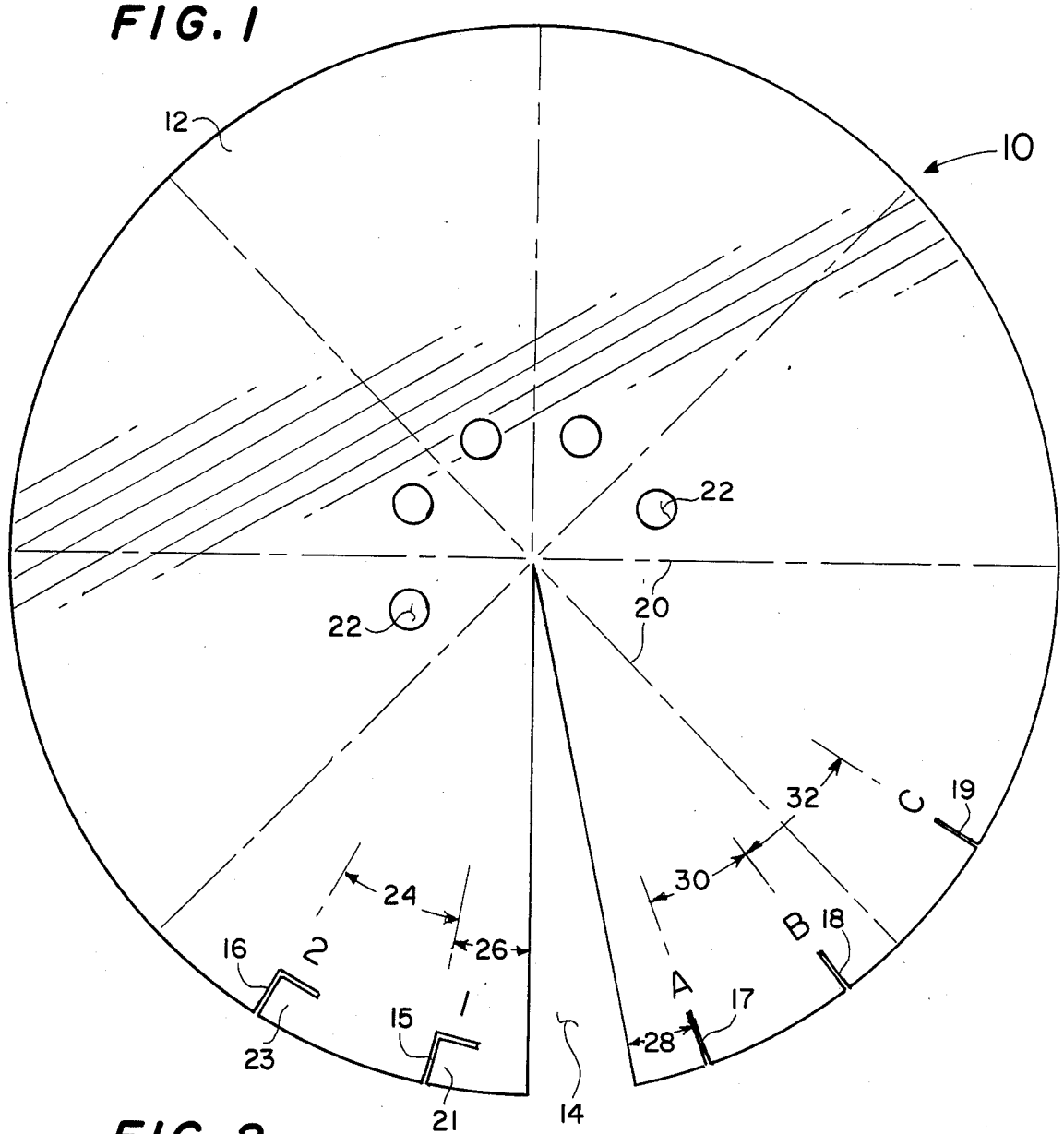
FIG. 1 is a plan view of the wheel protector of the invention.

In FIG. 1, a plan view of the wheel protector 10 of my invention, is shown. A disc 12 is cut from a thin, stiff material such as cardboard, plastic sheet, or the like. Although not essential, I prefer to cut a 5°-10° segment 14 from the disc. Adjacent cutout segment 14 are three slits 17, 18, and 19 cut radially into the periphery of disc 12. Although not critical, the length of slits 17, 18, and 19 may be about 1". As will be noted, slits 17, 18, and 19 are labeled A, B, and C on the disc for reference.

Adjacent the opposite side of segment 14 are two tabs 21 and 23 formed by L-shaped slits 15 and 16, respectively. Tab 15 is numbered on disc 12 as "1" and tab 23 as "2". As will be understood, the labeling of slots and tabs permits simple instructions to be provided for forming various diameter cones.

Figure 3:
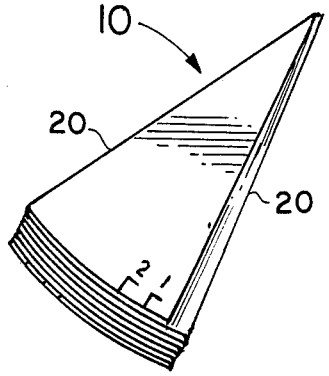
FIG. 3 is a perspective view showing the wheel protector of FIG. 1 folded into a 45° segment for storage or mailing.

Although not essential to the invention, I prefer to provide a plurality of radial score marks 20 equally spaced around disc 12. For example, a spacing of 45° may be used. These score marks permit the disc 12 to be folded into a compact package by folding accordion fashion along score marks 20. FIG. 3 shows a perspective view of the protector 10 in the folded condition. For example, when a thin cardboard is used to form disc 12, the folded package as shown in FIG. 3 will be quite compact and the device may be mailed in a mailing envelope or easily packaged in a plastic wrap or the like for display purposes.

A plurality of finger holes 22 each of which may be on the order of ¾" in diameter is provided, arranged in a circular pattern around the center of disc 12. For example, five finger holes 22 will permit the device to be held in one hand as described below.

Figure 2:
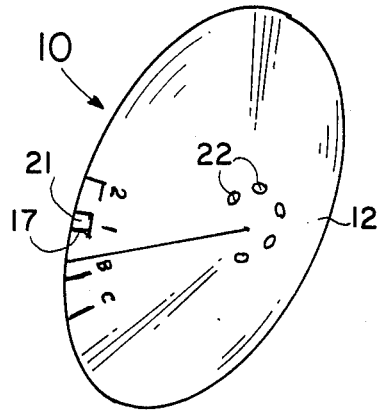
FIG. 2 is a perspective view of the wheel protector of FIG. 1 formed into a shallow cone having a desired diameter.

Turning now to FIG. 2, the disc of FIG. 1 is shown in which tab 21 has been engaged with slit 17, causing the disc to assume a conical form and reducing the outside diameter of the device. Further, it may be noted that coupling tab 21 to either slit 18 or slit 19 will reduce the diameter of the device further. As will not be recognized, the selection of angular distances 24, 26, 28, 30, and 32 in FIG. 1 will control the diameters of the cone formed by interlocking tabs 21 or 23 with slits 17, 18 or 19. Thus, a variety of sizes can be provided. For example in one implementation of the invention, inserting tab 21 in slit A produces a 16" diameter, inserting tab 23 in slit A produces a 15" diameter, inserting tab 23 in slit 18 produces a 14" diameter, and inserting tab 23 in slit 19 produces a 13" diameter. It will be clear that other sizes can be provided if needed.

When it is desired to use the protector of the invention, it is adjusted for the appropriate wheel size, and the fingers of one hand inserted into finger holes 22. The conical shape protector 10 is then held in place over the wheel with one hand while the cleaning liquid is sprayed or brushed onto the wheel sidewall with the other hand. Similarly, the wheel protector 10 may be held in place while the tire is rinsed. Thus, the wheel and wheel cover will be completely protected from any damage or contamination from the tire sidewall cleaning operation.

Where a protector in accordance with the invention is formed from thin cardboard, the cost will be very low and the device may be used as a promotional giveaway. Thus, after using, it may be discarded. Where a thin plastic sheet or other durable material is used to form the protector of my invention, the device may be rinsed off after use and put away for future use. The wheel protector 10, after being formed into the desired diameter cone-shaped form, may be stapled or otherwise fastened if it is desired to limit its use to a single size wheel and it is desired to save the device for future use.

Although a specific design has been shown, it is to be understood that this is for exemplary purposes only and various modifications may be made thereto without departing from the spirit and scope of the invention.

I claim:

1. A hand-held protector for a vehicle wheel comprising:
   a disc cut from thin, flexible sheet stock, said disc having a radial cut from a center thereof to the periphery thereof;
   a plurality of radial slits spaced apart from each other in a first circumferential direction from said radial cut;
   at least one tab for engaging a selected one of said radial slits to thereby form said disc into a cone, said tab cut into said periphery of said disc adjacent and spaced apart from said radial cut in a second circumferential direction, said engaged slit selected to thereby produce a cone having a desired base diameter and whereby other base diameters are selectable.

2. The wheel protector as recited in claim 1 which further comprises means for permitting holding of said cone by hand against a vehicle wheel.

3. The wheel protector as recited in claim 2 in which said means includes a plurality of finger holes adjacent said center of said disc.

4. The wheel protector as recited in claim 1 in which said sheet stock is cardboard cardstock.

5. The wheel protector as recited in claim 4 in which said cardstock is coated.

6. The wheel protector as recited in claim 1 in which said sheet stock is sheet plastic.

7. The wheel protector as recited in claim 1 in which said sheet stock is sheet metal.

8. The wheel protector as recited in claim 1 in which said radial cut is a segment of said disc.

9. The wheel protector as recited in claim 4 in which said disc includes a plurality of score marks from said center to said periphery to permit said disc to be folded to form a segment of said disc.

10. A device for protecting a vehicle wheel during cleaning of a tire on said wheel comprising:
    a disc of thin stock having a diameter greater than the diameter of said wheel, said disc having a radial cut from a center thereof to the periphery thereof;
    a short radial slit in said periphery spaced a first selected distance apart in one circumferential direction from said radial cut;
    a tab in the form of a circumferential flap cut in and spaced apart from said radial cut in the opposite circumferential direction, said spacings of said slit and said tab selected to permit forming of a cone having the diameter of said wheel when said tab is engaged with said slit; and
    said disc includes a set of finger holes adjacent to and around said center of said disc to permit said cone to be held against said wheel during cleaning of said tire.

11. A hand-held protector for vehicle wheels of varying diameters comprising:
    a disc of thin cardboard stock having a diameter greater than the diameter of the largest of said wheels, said disc having a radial cut from a center thereof to the periphery thereof;
    a plurality of short radial slits in said periphery spaced from said radial cut in a first circumferential direction, said slits spaced apart selected distances from each other;
    at least one tab in the form of a circumferential flap cut in and spaced apart from said radial cut in the opposite circumferential direction, said spacings of said slits and said tab selected to permit forming of a cone having the diameter of a selected wheel to be protected when said tab is engaged with said selected slit; and
    said disc includes a set of finger holes adjacent to and around said center of said disc to permit said cone to be held against said wheel when protection is required, said disc including a plurality of radial score marks from said center to said periphery to permit said disc to be folded to form a compact segment of said disc for packaging or mailing thereof.

* * * * *